United States Patent [19]
Van Becelaere

[11] 4,140,151
[45] Feb. 20, 1979

[54] VACUUM RELIEF DOOR ASSEMBLY

[75] Inventor: Robert M. Van Becelaere, Grandview, Mo.

[73] Assignee: Ruskin Manufacturing Company, Grandview, Mo.

[21] Appl. No.: 809,604

[22] Filed: Jun. 24, 1977

[51] Int. Cl.[2] .......... F16K 17/04
[52] U.S. Cl. .......... 137/526; 137/559
[58] Field of Search .......... 137/526, 559, 584

[56] References Cited

U.S. PATENT DOCUMENTS

| | | | |
|---|---|---|---|
| 1,511,610 | 10/1924 | Holmes | 137/584 X |
| 2,224,287 | 12/1940 | Busch | 137/526 X |
| 2,452,612 | 11/1948 | Swenberg | 137/526 X |
| 3,782,411 | 1/1974 | Turner | 137/526 X |

*Primary Examiner*—William R. Cline
*Attorney, Agent, or Firm*—Fishburn, Gold & Litman

[57] ABSTRACT

A vacuum relief and access door assembly, for use on a duct downstream of a fire or control dampers, comprises a frame including a duct facing surface with a seal member thereon, a closure member having side edges in sealing engagement with the seal member, and removable retaining members mounted on the frame and resiliently urging the closure member into sealing engagement with the seal member, yielding to allow the closure member to displace toward the duct to allow air flow thereby for vacuum relief and returning into sealing engagement with the seal member.

6 Claims, 5 Drawing Figures

VACUUM RELIEF DOOR ASSEMBLY

The present invention relates to vacuum relief doors for air or gas flow ducts and more particularly to such a door having removable retaining members with resilient portions which permit displacement for vacuum relief and which return the closure member into sealing engagement after displacement thereof for vacuum relief.

Fire regulations require the use of fire dampers in some HVAC ducts for preventing the spread of fire and toxic gases in the event of fire. The fire dampers are held open for normal airflow by fusible links which melt above a certain temperature and allow the damper to close the duct to airflow.

In relatively large, high velocity ducts, deployment of a damper results in the creation of a vacuum immediately downstream of the damper due to the inertia of the moving column of air. Depending on the size of the duct and the velocity of airflow, the vacuum generated can result in collapse of the duct walls immediately downstream of the damper. Other large ducts may also have sudden pressure change that can cause collapse and therefor need relief and access doors.

To prevent such duct collapse, vacuum relief doors are employed which open a relatively large area in the duct wall immediately downstream of the damper and allow a rapid inflow of air for relief of the vacuum condition.

In the vacuum relief doors of the prior art, upon creation of a vacuum within the duct, the latches holding the door on its mounting frame released and allowed the door to be sucked into the duct restrained by a tether chain. In such an arrangement, the duct walls might be damaged by the door flying thereinto upon release. In any case, remounting of the door required retrieval thereof and manipulation within the duct.

The vacuum relief door of the present invention resiliently displaces for vacuum relief and returns to its original position. It is then necessary to release the removable retainers and remove the door from its mounting for entry into the duct to reset the damper. This may be accomplished easily and with a minimum of door manipulation. Access to the damper for inspection is also provided at any time in the same manner.

The principal objects of the present invention are: to provide a vacuum relief and access door for a high pressure duct which door returns to closing position after the vacuum is relieved; to provide such a door for use in a duct downstream of a fire damper for preventing vacuum induced collapse of the duct upon deployment of the fire damper; to provide such a vacuum relief door which is resiliently displaceable in response to a vacuum in the duct for vacuum relief and which is restrained during operation for vacuum relief and automatically returned into sealing engagement with its frame after operation; to provide such a vacuum relief door having quickly releasable retainers for bodily removal of the door and access to the duct; to provide such a vacuum relief door which effects positive sealing of the duct access opening during normal operation of the duct; to provide such a vacuum relief door which is relatively easy to install and maintain; to provide such a vacuum relief door which is economical to manufacture, durable in construction, and positive in operation, and which is particularly well adapted for its intended purpose.

Other objects and advantages of this invention will become apparent from the following description taken in connection with the accompanying drawings wherein are set forth, by way of illustration and example, certain embodiments of this invention.

The drawings constitute a part of the specification, include an exemplary embodiment of the present invention, and illustrate various objects and features of the vacuum relief door assembly.

Figure 2:
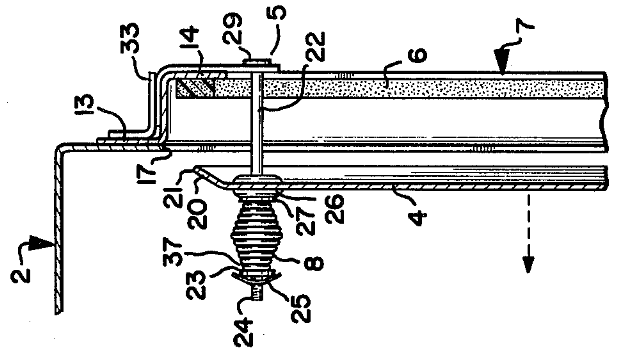
FIG. 2 is a fragmentary taken on line 2—2 of FIG. 1 and showing the door in a displaced position.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring to the drawings in more detail:

The reference numeral 1 generally designates a vacuum relief door assembly for use in a duct 2 and particularly for use in a duct downstream of a fire damper 3 mounted in the duct 2. The vacuum relief door assembly 1 comprises a door or closure member 4 resiliently held by a plurality of retainers 5 in sealing engagement with a sealing member or gasket 6 mounted on either the periperial edge of the closure member or the door mounting frame 7, said gasket 6 being illustrated as mounted on the frame 7. The vacuum relief door assembly 1 is adapted to provide a rapid influx of air into the duct 2 in response to a vacuum condition within the duct 2 by limited displacement of the door 4 from the gasket 6 against the resilient returning force of suitable resilient members which in the illustrated structure are springs 8 of the retainers 5.

The mounting frame 7 may be any suitable arrangement with provisions for retaining the door 4, and having a flange or surface mounting the gasket 6, and providing suitable mounting of the retainers 5, such as Z shaped members welded together at the ends thereof. For reasons of manufacturing economy, the illustrated frame 7 is constructed from a single elongated sheet of metal cut, stamped, and folded into a closed rectangular frame with the free ends brought together and welded with the aid of a corner brace 9 in the form of a short section of angle. The external corners 10 of the frame 7 are preferably reinforced by gussets 11 welded to each of the external corners 10. The internal corners 12 are reinforced by welding adjacent portions thereof together to provide a strong frame to maintain its shape. The frame 7 so constructed includes an outwardly projecting, frame mounting flange 13 and inwardly projecting, closure retaining flange 14, and a web 15 connecting the flanges 13 and 14 together.

The frame 7 is suitably and sealingly attached to a side wall 16. The frame 7 may be attached to the duct by bolts and gaskets, but in the illustrated structure it's attachment is by welding the frame mounting flange 13 in surrounding relation to the borders of the access opening 17 so it reinforces the duct walls around the opening.

The closure retainer flange 14 has mounted thereon the gasket or sealing member 6 on a surface 18 thereof which faces toward the duct 2. The gasket 6 extends around the entire periphery of the closure retaining flange 14 and is adapted to receive the closure member 4 in sealing engagement therewith. The gasket 6 may be formed of any suitable sealing material, such as polyurethane foam, which will provide an effective gas seal against the compressed air within the duct 2 under normal operating conditions.

The door or closure member 4 is a planar member having dimensions slightly greater than the opening 19 enclosed by the closure retaining flange 14. In order to provide for a more effective seal under normal operating conditions of the duct 2, the external or peripheral edges 20 of the door 4 are formed into an outwardly projecting rim 21. The outwardly projecting rim 21 allows greater compression of the gasket 6 than would be possible if the edges 20 were in the same plane as the door 4, thereby providing a more effective seal.

In certain applications of the duct 2, such as heating or air conditioning, it might be desirable for the door 4 to be thermally insulated. Such insulation for the door 4 may be provided by laminating layers of insulating material (not shown) and a support layer, or alternatively by constructing the door 4 of a homogenious material such as a plastic having the necessary structural strength. The illustrated door 4 for non-insulative applications is constructed from a single sheet of metal cut and stamped to shape as described above.

The rim 21 of the door 4 is held in sealing engagement with the gasket 6 by the retaining means or retainers 5 mounted on the door 4 and connected with the frame 7. The retainers 5 comprise guide means such as a guide rod 22 slidably mounted in apertures (not shown) in the door 4 with the springs 8 sleeved thereon and held in compression by abutments on the ends of the rods 22. In each of the illustrated retainers 5, the spring abutment consists of a washer 23 sleeved onto the rear or inner end 24 of the rod 22. The washer 23 may be prevented from rearward or inward movement along the rod 22 by any suitable fastener on the end 24 of the rod, and in the illustrated retainer, the end 24 of the rod 22 is threaded and a fastener such as a Tinnerman clip 25 or a conventional nut may be threaded onto the end 24. In order to provide a seal between the aperture in the door 4 and the rod 22, a sealing grommet 26 is included in the apertures (not shown) in the door 4. A washer 27 is included between the forward end 28 of the spring 8 and the grommet 26 to better distribute the force of the spring against the door 4. The front or outer end 29 of the rod 22 may be attached or otherwise suitably connected to the closure retaining flange 14 of the frame 7.

Figure 1:
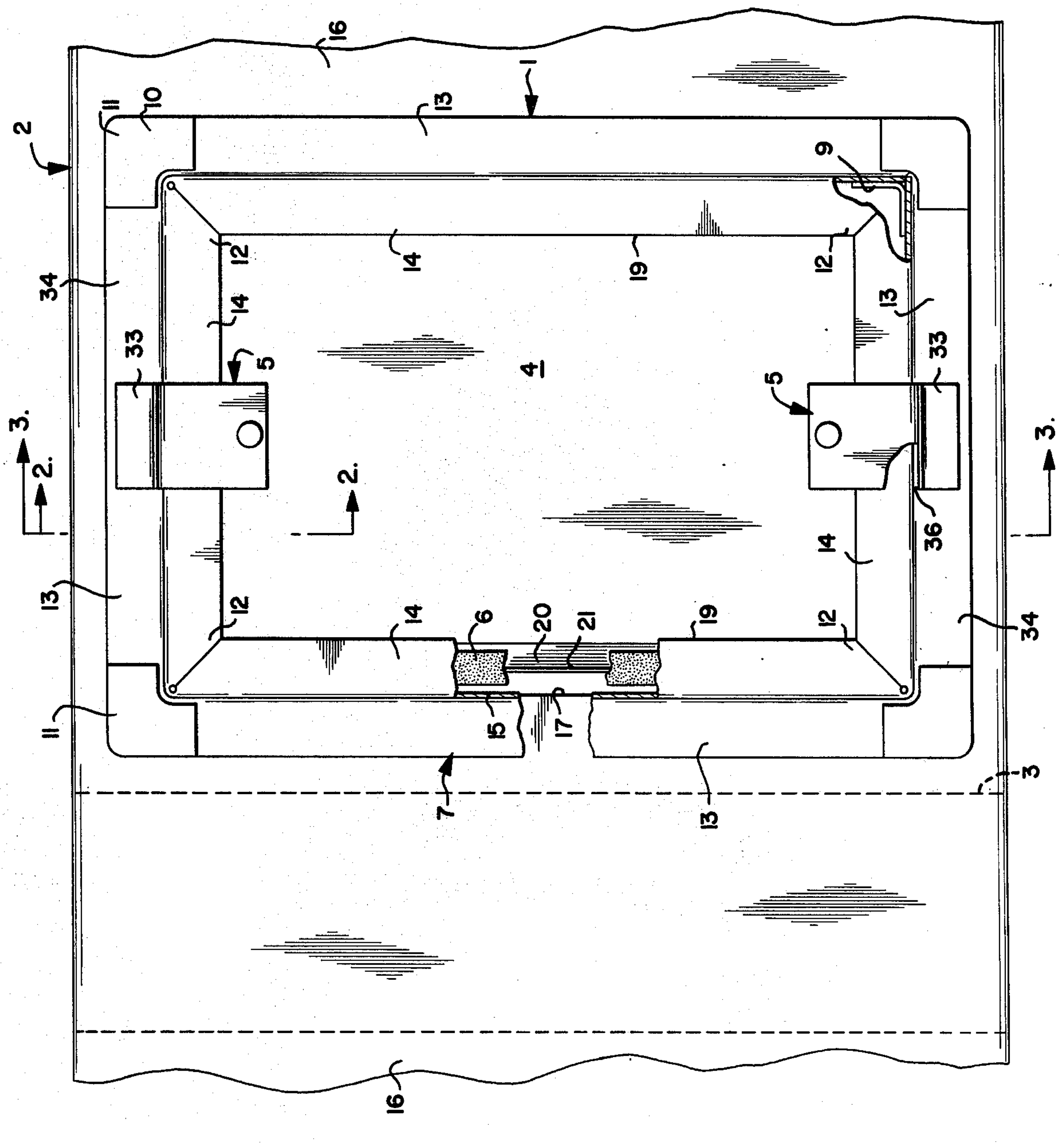
FIG. 1 is a front elevational view of the vacuum relief door assembly attached to the wall of a duct.

The door of the invention is also an access door to the duct and is therefor bodily removable. Suitable releasable latches connect the door to the frame 7. In the illustrated structure the latches are a quick release type and also serve to aid in positioning the door in the frame. The front or outer end 29 of the rod 22 is attached to a latch bracket 30 which is releasably attachable to the frame 7. The bracket 30 includes an attachment leg 31 having the rod 22 attached thereto and includes a lug 32 formed at a right angle to the attachment leg 31. A slot forming plate or bracket 33 is attached, as by welding, to the outward facing surface 34 of the frame mounting flange 13. The slot forming bracket 33 includes a leg 35 spaced from the web 15 of the frame 7 and forms a bracket retaining slot 36 in cooperation therewith. The slot 36 (see FIG. 1) is adapted to slidably receive the lug 32 of the latch bracket therein. The spring 8 is a coiled compression spring with the front or outer end 28 thereof urging the door 4 and, therefore, the rim 21 into sealing engagement with the gasket 6. The rear end 37 of the spring 8 is retained on the rod 22 by the combination of the washer 23 and the fastener 25 on the rear end 24 of the rod 22. The rod 22 is held in position by attachment thereof to the latch bracket 30 received in the slot 36 on the mounting frame 7.

Figure 4:
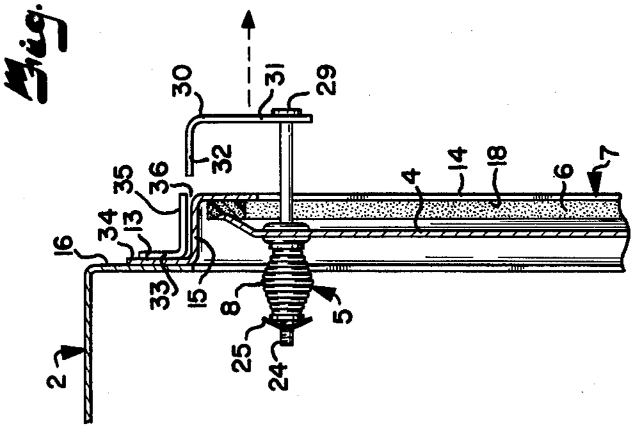
FIG. 4 is a fragmentary view similar to FIG. 2 showing the extended position of the door retainer for removal of the door for access to the duct.
Figure 3:
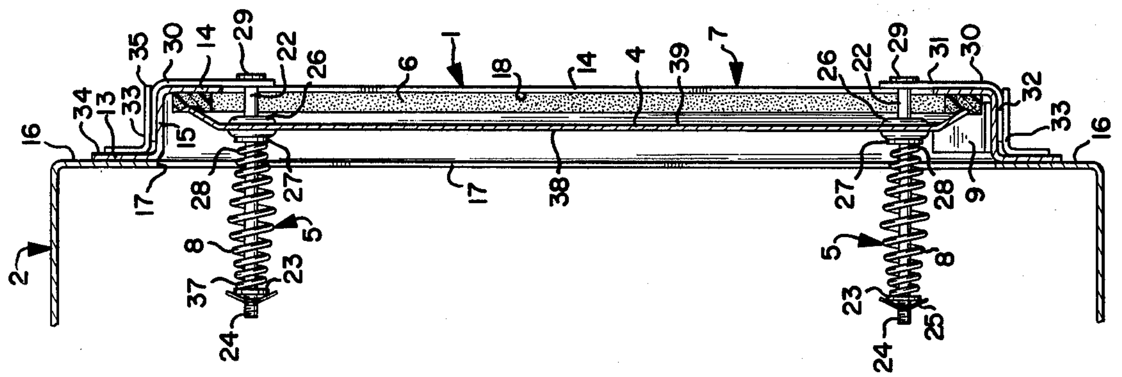
FIG. 3 is a fragmentary vertical sectional view of the vacuum relief door assembly taken along line 3—3 of FIG. 1 and showing the resilient door retainers.

With reference to FIG. 4, removal of the door 4 for access to the duct 2 may be accomplished by withdrawal of the latch bracket 30 until the lug 32 is free of the slot 36, rotating the bracket 30 about the rod 22 in order to clear the latch bracket 30 past the closure retaining flange 14, repeating the procedure with the remaining retainers 5, then lifting the door into the duct. The door 4 may be remounted by reversing the procedure. While the vacuum relief door assembly 1 is illustrated with two retainers 5, in a relatively large assembly for a correspondingly large duct 2, it may be necessary to employ more retainers 5, however, preferably always in pairs.

Figure 5:
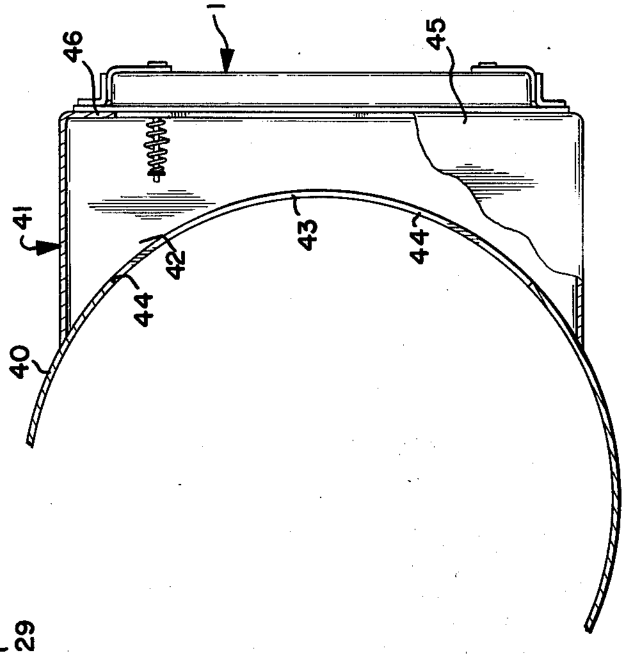
FIG. 5 is a transverse sectional view at a reduced scale of a duct having a round cross-section and showing a transition duct, having the vacuum relief door assembly attached to one end thereof, attached to the round duct and communicating therewith.

The vacuum relief door assembly 1 has so far been described in association with a duct 2 having a flat side wall 16. However, if the assembly 1 is to be used on a duct 40 having a round cross-section (see FIG. 5), it will be necessary to include a transition duct 41 between the duct 40 and the assembly 1. While it would be possible to construct the assembly 1 essentially as described above with curved side members of the frame 7 and a curved closure member 4, such an approach would encounter higher manufacturing costs, possible sealing problems, and more critical design.

The transition duct 41 may have any suitable cross-section and is illustrated as being rectangular. The inner or rear end 42 of the transition duct 41 is cut to fit the shape of the curved wall 43 of the round duct 41 and is sealingly attached to the wall 43 in surrounding relation to an access opening 44 in the wall 43. The outer or front end of the transition duct 41 is cut flat to sealingly receive the mounting frame 7 of the vacuum relief door assembly 1 attached thereon. The front end 45 may include an inwardly turned flange 46 for facilitating attachment of the mounting frame 7 thereto.

Summarizing the operation of the vacuum relief door assembly 1, whenever a fire damper 3 is deployed in an operating duct 2, a vacuum is created in the duct immediately downstream of the damper 3. Such a vacuum creates a pressure differential on the closure member 4 of the vacuum relief door assembly 1. The pressure on the inside 38 of the door 4 is negative while the pressure on the outside surface 39 is positive, with the result that the door 4 is drawn inward toward the duct 2 separating the door edges 20 from the gasket or seal 6 and permitting entry of air to relieve the pressure differential. As soon as the vacuum condition is relieved, that is, the air pressure is equalized, the door 4 is urged back into sealing engagement with the gasket 6 by the force of the compression springs 8 of the retainers 5. The door 4 remains connected with the mounting frame 7 except when intentionally removed as described above.

While certain forms of the present invention have been described and illustrated, it is not to be limited thereto except insofar as such limitations are included in the following claims.

What I claim and desire to secure by Letters Patent is:

1. A vacuum relief door assembly for use on a duct, said duct including an access opening formed in a wall thereof, said vacuum relief door assembly comprising:
- (a) a door mounting frame sealingly attached to said duct wall surrounding the borders of said access opening, said frame including a closure retaining flange having a surface facing said duct;
- (b) a planar closure member having one side facing said duct and having peripheral edges facing said duct facing flange;
- (c) a resilient peripheral seal member mounted on one of said duct facing flange surface and said closure member peripheral edge; and
- (d) retaining means normally urging said closure member into sealing engagement relative to said frame and operable in response to a selected negative pressure in said duct to allow said closure member to temporarily displace from said sealing engagement for relief of said negative pressure and to return into said sealing engagement, said retaining means comprising:
  - (1) at least two resiliently retracting guide units mounted on said closure member at spaced apart locations;
  - (2) each of said guide units including a rod disposed perpendicular to the plane of said closure member and resiliently urged toward said duct;
  - (3) each of said rods having the end thereof more remote from said duct connected to rod connecting means on said mounting frame, said rod connecting means comprising:
    - (a) a slot forming plate mounted on said frame in an operative location relative to each respective guide unit, said plate forming a bracket retaining slot in cooperation with said frame; and
    - (b) a bracket attached to the end of said rod more remote from said duct, said bracket having a portion removably receivable in said slot.

2. A vacuum relief door assembly as set forth in claim 1 wherein each of said guide units comprises:
- (a) said rod mounted on said mounting frame closure retaining flange and projecting toward said duct through an aperture in said closure member;
- (b) a coil compression spring sleeved onto said rod with one end of said spring abutting said closure member; and
- (c) a spring abutment fastened to the end of said rod nearer said duct, said abutment retaining said spring in compressed abutment against said closure member thereby retaining said closure member in sealing engagement with said resilient seal member.

3. A vacuum relief door assembly for use downstream of a fire damper means in a duct, said duct including an access opening formed in a wall thereof, said vacuum relief door assembly comprising:
- (a) a rectangular door mounting frame constructed of elongated members having a Z-shaped cross-section, said frame having an outwardly projecting frame mounting flange having a surface facing away from said duct, an inwardly projecting closure retaining flange having a surface facing said duct, and a web connecting said flanges, said frame mounting flange being sealingly attached to said duct wall surrounding the borders of said access opening;
- (b) a resilient peripheral seal member mounted on said closure retaining flange duct facing surface;
- (c) a planar closure member having one side facing said duct and having side edges formed into a rim projecting away from said duct, said closure member being resiliently mounted with said rim in sealing engagement with said seal member, said closure member having at least two suitably sized and located apertures;
- (d) retaining means normally urging said closure member rim into said sealing engagement and operable in response to selected negative pressure in said duct to allow said closure member to temporarily displace toward said duct thereby releasing said rim from said sealing engagement for relief of said negative pressure and to return into said sealing engagement, said returning means comprising:
  - (1) a sealing grommet mounted in each of said closure member apertures, each grommet having a rod receiving aperture therein;
  - (2) a rod slidably received in each of said grommet apertures and disposed perpendicularly to the plane of said closure member;
  - (3) a coil compression spring sleeved onto each rod, each spring having one end abutting said closure member around its respective aperture;
  - (4) a spring retaining abutment fastened on each rod on the end thereof nearer said duct; and
  - (5) the more remote end of said rods being attached to rod connecting means on said mounting frame whereby said closure member rim is urged into said sealing engagement, said rod connecting means comprising:
    - (a) a slot forming plate associated with each of said retaining means and mounted projecting from said non-duct-facing surface of said frame mounting flange, said plate spaced from said web and forming a bracket retaining slot therewith; and
    - (b) a bracket connected to each of said rods on the end thereof more remote from said duct, each of said brackets having a lug removably receivable in a respective slot.

4. A vacuum relief door assembly for use on a duct having an access opening formed in a wall thereof, said relief door assembly comprising:
- (a) a door mounting frame sealingly attached to a duct wall surrounding the borders of an access opening, said frame including a closure retaining flange having a surface facing said duct;
- (b) a closure member having one side facing said duct and having a peripheral edge portion facing said facing surface of the retaining flange;
- (c) a resilient peripheral seal member on one of said retaining flange surface and said peripheral edge portion of the closure member;
- (d) at least two guide rods at spaced apart locations and slidably mounted relative to the closure member and extending normal thereto;

(e) resilient means cooperating with each of said guide rods and urging said closure member toward said facing surface of the retaining flange; and (f) cooperating means on each guide rod and the mounting frame held in engagement by the respective resilient means for releasably retaining the guide rods on the mounting frame and the closure member engaged with said seal member with said resilient means operable in response to a selected negative pressure in said duct to permit said closure member to temporarily displace from said sealing engagement for relief of said negative pressure and to return into said sealing engagement.

5. A vacuum relief door assembly as set forth in claim 4 wherein said closure member has at least two suitably sized and located apertures, and including:

(a) a sealing grommet mounted in each of said closure member apertures, each grommet having a rod receiving aperture therein;

(b) one of said guide rods being slidably received in each of said grommet apertures and disposed perpendicularly to the plane of said closure member;

(c) said resilient means each being a coil compression spring sleeved onto a respective guide rod, each spring having one end abutting said closure member around its respective aperture;

(d) a spring retaining abutment fastened on each guide rod on the end thereof nearer said duct.

6. A vacuum relief door assembly as set forth in claim 4 wherein said cooperating means comprises:

(a) an angular bracket connected to each of said guide rods on the end remote from said duct with one portion of each parallel to the respective guide rod; and (b) angular surfaces on the mounting frame for substantially mating engagement by the angular bracket to retain the closure member against lateral movement.

* * * * *